US008059698B2

(12) United States Patent
Mester et al.

(10) Patent No.: US 8,059,698 B2
(45) Date of Patent: Nov. 15, 2011

(54) METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

(75) Inventors: Roland Mester, Thalwil (CH); Andreas Thiel, Wilen b. Wollerau (CH)

(73) Assignee: U-Blox AG, Thalwil (CH)

( * ) Notice: Subject to any disclaimer, the term of this patent is extended or adjusted under 35 U.S.C. 154(b) by 1081 days.

(21) Appl. No.: 11/729,820

(22) Filed: Mar. 30, 2007

(65) Prior Publication Data
US 2008/0232441 A1    Sep. 25, 2008

(30) Foreign Application Priority Data

Mar. 21, 2007   (EP) ..................................... 07405097

(51) Int. Cl.
*H04B 1/00* (2006.01)
(52) U.S. Cl. ...................................................... 375/150
(58) Field of Classification Search .................. 375/150, 375/136, 147
See application file for complete search history.

(56) References Cited

U.S. PATENT DOCUMENTS

| 4,418,418 | A | | 11/1983 | Aoki | |
|---|---|---|---|---|---|
| 5,781,156 | A | | 7/1998 | Krasner | |
| 6,028,887 | A | * | 2/2000 | Harrison et al. | 375/147 |
| 6,151,353 | A | * | 11/2000 | Harrison et al. | 375/136 |
| 2003/0081660 | A1 | * | 5/2003 | King et al. | 375/150 |
| 2004/0095275 | A1 | * | 5/2004 | Warloe et al. | 342/357.12 |
| 2006/0056497 | A1 | * | 3/2006 | Lennen | 375/150 |
| 2008/0063123 | A1 | * | 3/2008 | De Mey et al. | 375/350 |
| 2008/0219327 | A1 | * | 9/2008 | Rushanan | 375/146 |

FOREIGN PATENT DOCUMENTS

GB        2 187 578 A        9/1987

* cited by examiner

*Primary Examiner* — Jaison Joseph
(74) *Attorney, Agent, or Firm* — Oliff & Berridge, PLC

(57) ABSTRACT

An acquisition unit of a GNSS receiver base band circuit comprises a correlator (40) with a correlator shift register (43) to which a correlation sequence derived from a basic sequence characteristic for a satellite is fed by a code generator (41). Each of the N=32 or more memory cells of the correlator shift register (43) is connected to two correlator cells (44a, 44b) for multiplying digital values of the correlator sequence from the memory cell with data values of a data sequence, adding up the products and storing the sum in a register as a correlation value pertaining to one of N relative phase positions of the correlation sequence relative to the data sequence during a correlation phase. During a subsequent read-out phase the registers of each row of correlator cells (44a; 44b) are connected to form a daisy chain and the correlation values are fed through the same to appear sequentially at the output of the last register in the row while the correlator shift register (43) and the rows of registers are sequentially filled with initial values for the next correlation phase.

23 Claims, 5 Drawing Sheets

METHOD OF PROCESSING A DIGITAL SIGNAL DERIVED FROM AN ANALOG INPUT SIGNAL OF A GNSS RECEIVER, A GNSS RECEIVER BASE BAND CIRCUIT FOR CARRYING OUT THE METHOD AND A GNSS RECEIVER

FIELD OF THE INVENTION

The invention concerns a method for processing a digital signal derived from an analog input signal of a GNSS receiver which contains signals emitted by satellites of GNSS (Global Navigation Satellite System) positioning systems like GPS, GLONASS and GALILEO in order to determine a position. The invention also concerns a base band circuit for carrying out the method and a GNSS receiver comprising such base band circuit.

PRIOR ART

A method according to the generic type is known from US 2006/0 056 497 A1. Here, apparently, a plurality of products of basic values pertaining to a basic sequence characteristic of a satellite and data values derived from the input signal of the receiver are calculated in parallel by multipliers, with the products pertaining to different phase relations between the sequences in question. The products are added up and then stored in registers of a RAM-type memory unit from which they are later read out to be evaluated. The processing and storing of the products is accordingly complicated and time-consuming and the required circuit components take up relatively large portions of the chip surface. This in turn limits the number of multipliers which can be provided to operate in parallel. It is therefore hardly possible to correlate more than about 30 to 50 different phase positions of the basic sequence with respect to the data sequence at the same time.

SUMMARY OF THE INVENTION

This problem is solved by the features in the characterizing portion of claim 1. With the method according to the invention the correlation results are delivered sequentially for evaluation. They can then be processed immediately with no intermediate storage being required.

A GNSS receiver base band circuit suitable for carrying out the method according to the invention is proposed as well. The circuit components for carrying out the correlation and providing the results for evaluation are relatively simple. It is therefore possible to provide many correlator cells which operate in parallel and calculate each a correlation between a data sequence and a phase-shifted copy of a correlation sequence derived from the basic sequence. In this way, signal acquisition times can be considerably reduced and normally brought down to acceptable levels even in the case of a 'cold start' with no previous knowledge about satellite positions. Also proprosed is a GNSS receiver comprising a GNSS receiver base band circuit according to the invention.

BRIEF DESCRIPTION OF THE DRAWINGS

In the following the invention is described in more detail with reference to drawings showing an embodiment of the invention where.

DESCRIPTION OF THE PREFERRED EMBODIMENTS

Figure 1:
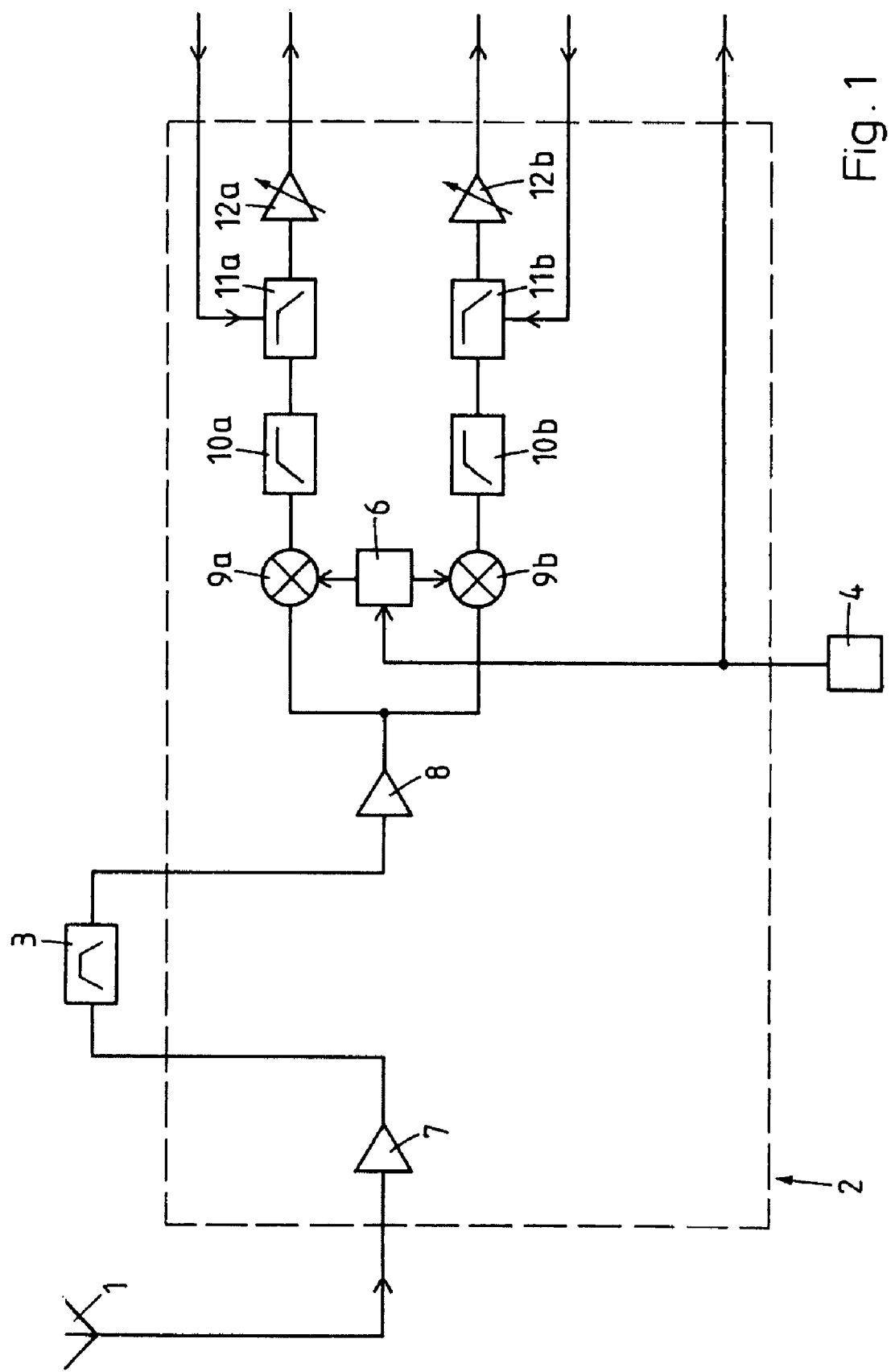
FIG. 1 shows a radio frequency circuit of a GNSS receiver according to the invention.
Figure 2:
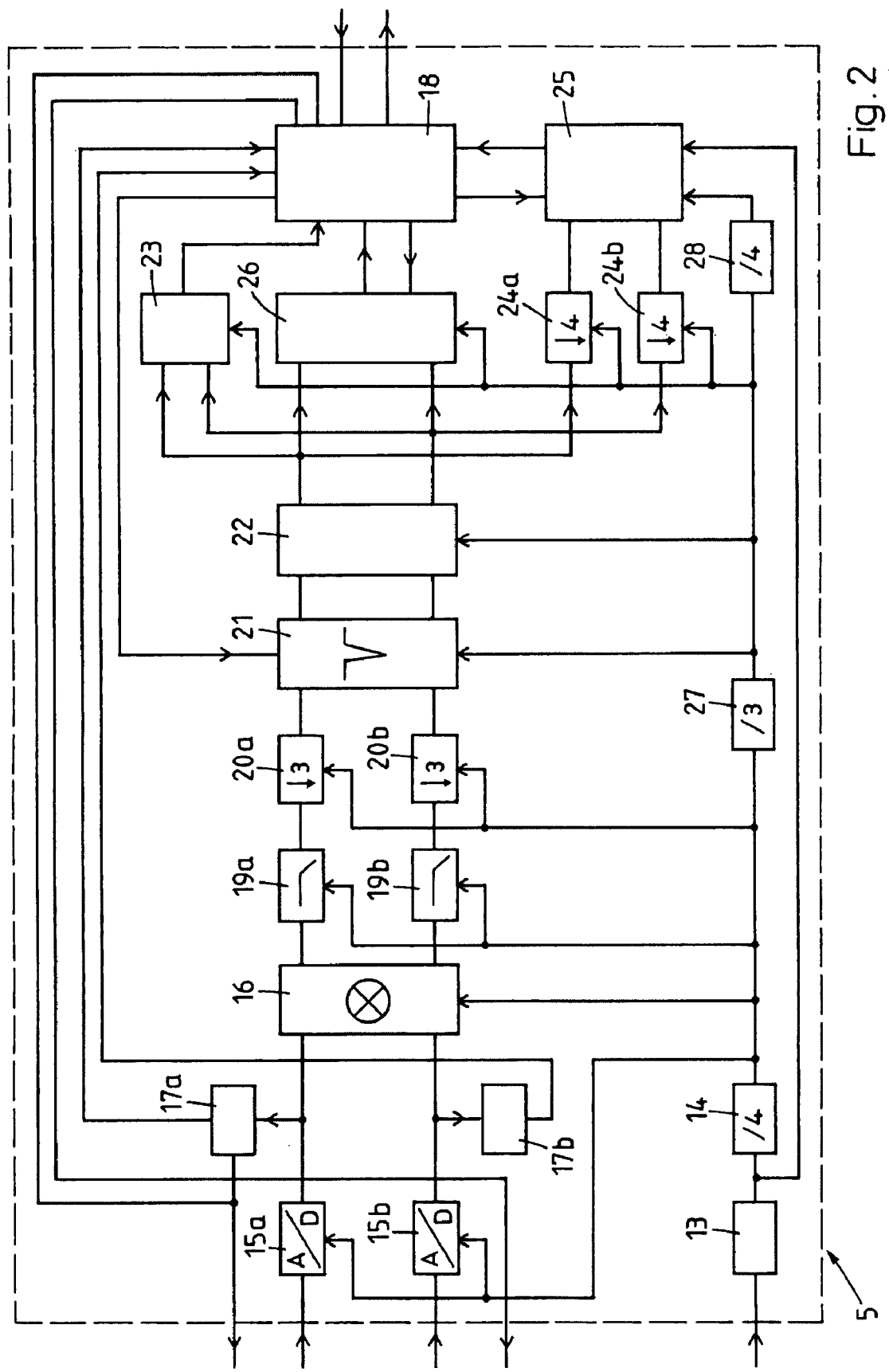
FIG. 2 shows a base band circuit of a GNSS receiver according to the invention.

The embodiment described in the following is a receiver suitable for GPS. However, the modifications which are necessary if other systems like GLONASS or GALILEO are to be used are straightforward. The receiver comprises (FIG. 1) an antenna 1 followed by a radio frequency circuit 2, a bandpass filter 3, a TCXO (temperature compensated crystal oscillator) 4 and (FIG. 2) a base band circuit 5. It is advantageous to implement the radio frequency circuit 2 and the base band circuit 5 each on a separate semiconductor chip but other solutions are also possible.

The bandpass filter 3, usually an SAW (surface acoustic wave) filter, is a component external to the radio frequency circuit 2. The TCXO 4, also a separate component, provides a basic frequency of between 19 MHz and 40 MHz, e.g., 26 MHz, which is fed to the radio frequency circuit 2 and further to the base band circuit 5. In the radio frequency circuit 2 the output signal of TCXO 4 controls a PLL unit 6 which produces a 3'158 MHz clock signal from which two further clock signals with half the clock rate, i.e., 1'579 MHz, are derived with one of the clock signals phase-shifted by 90° with respect to the other.

The antenna input of the radio frequency circuit 2 is followed by a low noise amplifier 7 which is connected, via the external band pass filter 3 and a controllable RF amplifier 8, to mixers 9a,b which also receive the clock signals from PLL unit 6. Together they form a complex mixer which provides an I and Q component of a complex analog signal shifted down to an intermediate frequency of approximately 3 MHz. They are each followed by a high pass filter 10a;b with a cutoff frequency of about 20 kHz and a controllable low pass filter 11a;b with a cutoff frequency of around 7.5 MHz connected to the output of the radio frequency circuit 2 via programmable gain amplifiers 12a;b.

The output of radio frequency circuit 2 is connected to an input of the base band circuit 5. The output signal of TCXO 4 is, via radio frequency circuit 2, also fed to the base band circuit 5 where it controls a PLL unit 13 producing a clock signal with a clock rate of 96 MHz which is reduced to 24 MHz by a subsequent frequency divider 14. Directly at the input of the base band circuit 5 A/D converters 15a,b with 5 bit resolutions are provided for sampling the input signal with a sampling rate of 24 MHz, producing a complex digital signal which is fed to a complex digital mixer 16 that reduces it to base band and to frequency analyzers 17a,b whose outputs are connected to a control unit 18 which controls low pass filters 11a,b in radio frequency circuit 2. The mixer 16 is followed by decimation filters 19a,b, each with a cut-off frequency of 3 MHz, and down-samplers 20a;b. A/D converters 15a,b, mixer 16, frequency analyzers 17a,b, decimation filters 19a,b and down-samplers 20a,b are controlled by the clock signal from frequency divider 14.

A band stop unit 21 for filtering a raw digital signal by removing continuous wave signals and a decimator 22 for reducing the filtered digital signal from 6 to 3 bits are followed by a frequency analyzer 23 whose output signal is used by control unit 18 to control the band stop unit 21 and, via down-samplers 24a,b, by an acquisition unit 25 for identifying components of the signal as emitted by specific satellites of the GNSS system as well as by a tracking unit 26 for continually tracking the said signal components and analyzing their time delays and for extracting data bits from them.

A frequency divider 27 produces, from the 24 MHz output of frequency divider 14, a 8 MHz clock signal which controls band stop unit 21, decimator 22, frequency analyzer 23, down-samplers 24a,b and tracking unit 26. A further frequency divider 28 provides a 2 MHz clock signal for the acquisition unit 25 which also receives the 96 MHz clock signal from PLL unit 13. The control unit 18 receives data from the tracking unit 25 which, apart from the time delays of signals emitted by the individual satellites, comprise almanac and ephemeris data extracted from the said signals. From those data the control unit 18 calculates the position of the GNSS receiver. The calculations which may also involve additional data stored in the receiver or transmitted to it via some additional link are carried out in ways well known in the art. The control unit 18 also controls the acquisition unit 25 and the tracking unit 26.

After the analog signal received by the antenna 1 (FIG. 1) has been amplified by low noise amplifier 7 its spectrum is reduced to a 30 MHz band centered at the GPS frequency of 1'575.42 MHz by band pass filter 3. After further amplification and mixing any DC component is removed by high pass filters 10a,b and high frequencies are suppressed by low pass filters 11a,b for anti-aliasing. The low pass filters 11a,b are controlled by the control unit 18 (FIG. 2) based on the outputs of frequency analyzers 17a;b in such a way that the signal is, with respect to the signal at a reference frequency of 3 MHz, attenuated by not more than −3 dB at 7.5 MHz and by at least −12 dB at 12 MHz, i.e., at half the sampling rate of A/D converters 15a,b at the input of base band circuit 5. The programmable gain amplifiers 12a,b adjust the signal to the input range of the A/D converters 15a,b.

The amplified and filtered complex analog signal is then converted to a complex digital signal by A/D converters 15a,b of base band circuit 5 and then derotated, i.e., shifted essentially to zero by complex digital mixer 16. After its spectrum has been reduced to a 3 MHz frequency band by decimation filters 19a,b, its sampling rate is reduced to 8 MHz by down-samplers 20a;b. This raw digital signal which is restricted to a fixed raw signal frequency band extending from −3 MHz to +3 MHz is then fed to band stop unit 21 for filtering. Several continuous wave interferers can be suppressed with only negligible distortion of the raw digital signal to produce a filtered digital signal restricted to a filtered signal frequency band which coincides with the raw signal frequency band. In a next step the filtered digital signal is requantized from 6 bits to 3 bits in the decimator 22 which uses a non-linear decimation table. The resulting digital signal is then fed in parallel to frequency analyzer 23, tracking unit 26 and, via down-samplers 24a,b which reduce the sample frequency to 2 MHz, to acquisition unit 25.

In the acquisition unit 25 a signal derived from this input signal is correlated with internally produced characteristic sequences of GNSS satellites at various Doppler frequencies and with various phase shifts. The relatively low 2 MHz sample frequency allows efficient processing of the signal and, as a consequence, fast lock-on to received satellite signals.

On the other hand, in the tracking unit 26, where the same sequences, frequencies and phase shifts are applied as have yielded high correlation values in the acquisition unit 25, the higher sample frequency of 8 MHz allows for a very precise determination of the positions of the correlation peaks and associated phases of the said satellite signals which in turn allows a precise calculation of receiver position. The results from frequency analyzer 23 which may be a part of the tracking circuit 26 using channels with varying scanning frequencies and constant sequences, are employed for the detection of any continuous wave interferers and determination of their interferer frequencies which are then used by the control unit 18 for controlling band stop unit 21 in such a way that the interferer frequencies are suppressed. The interferer frequencies can be identified by cyclical sweeping through the raw signal frequency band in steps of, e.g., 1 kHz and comparing the individual energy densities with a mean over the entire frequency band.

Figure 3:
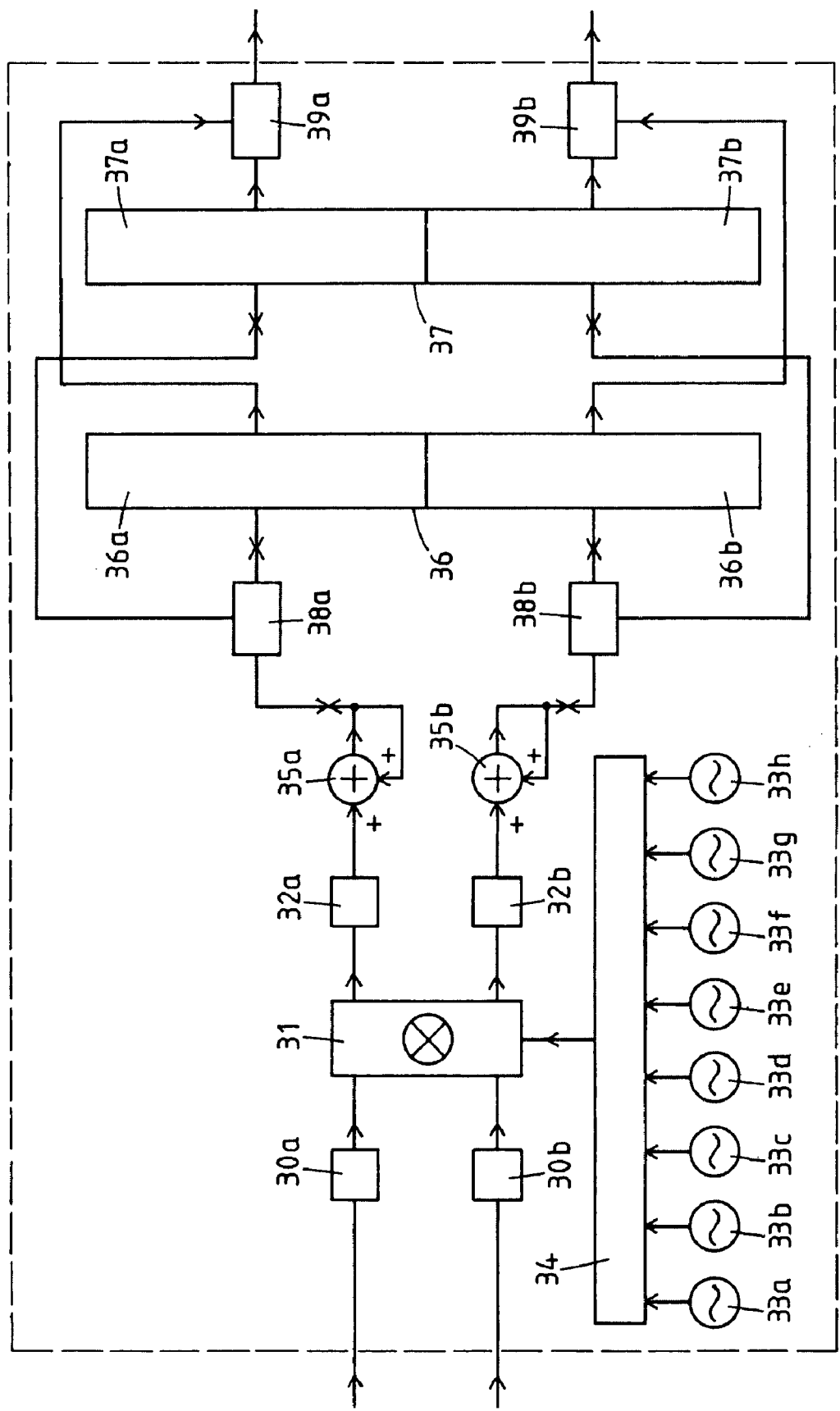
FIG. 3 shows an integrator of an acquisition unit forming part of the base band circuit of FIG. 2.

The acquisition unit 25 comprises three subunits. Its input is connected to the input of an integrator 29 (FIG. 3) with registers 30a,b followed by a complex mixer 31 and further registers 32a,b. The mixer 31 is controlled in turn by numerically controlled oscillators 33a-h via a multiplexer 34. Each of the registers 32a;b is followed by a limiting adder 35a;b which can be connected to either a memory unit 36a;b of a RAM-type memory 36 or a memory unit 37a;b of a second RAM-type memory 37 via switches 38a;b. Via further switches 39a;b either the memory units 36a;b or the memory units 37a;b can be connected to a first output line and a second output line, respectively, of the integrator 29. Each of the memory units 36a,b, 37a,b contains, for each of the eight oscillators 33a-h, a number of 7 bit memory cells which corresponds to the number of samples received during a basic interval, in the example 2'000. The address where a value is stored is determined by a number identifying the oscillator and the number of the sample, counted from the beginning of the basic interval. Preferably, the values pertaining to a specific oscillator are stored, in chronological order, under subsequent addresses.

Figure 4:
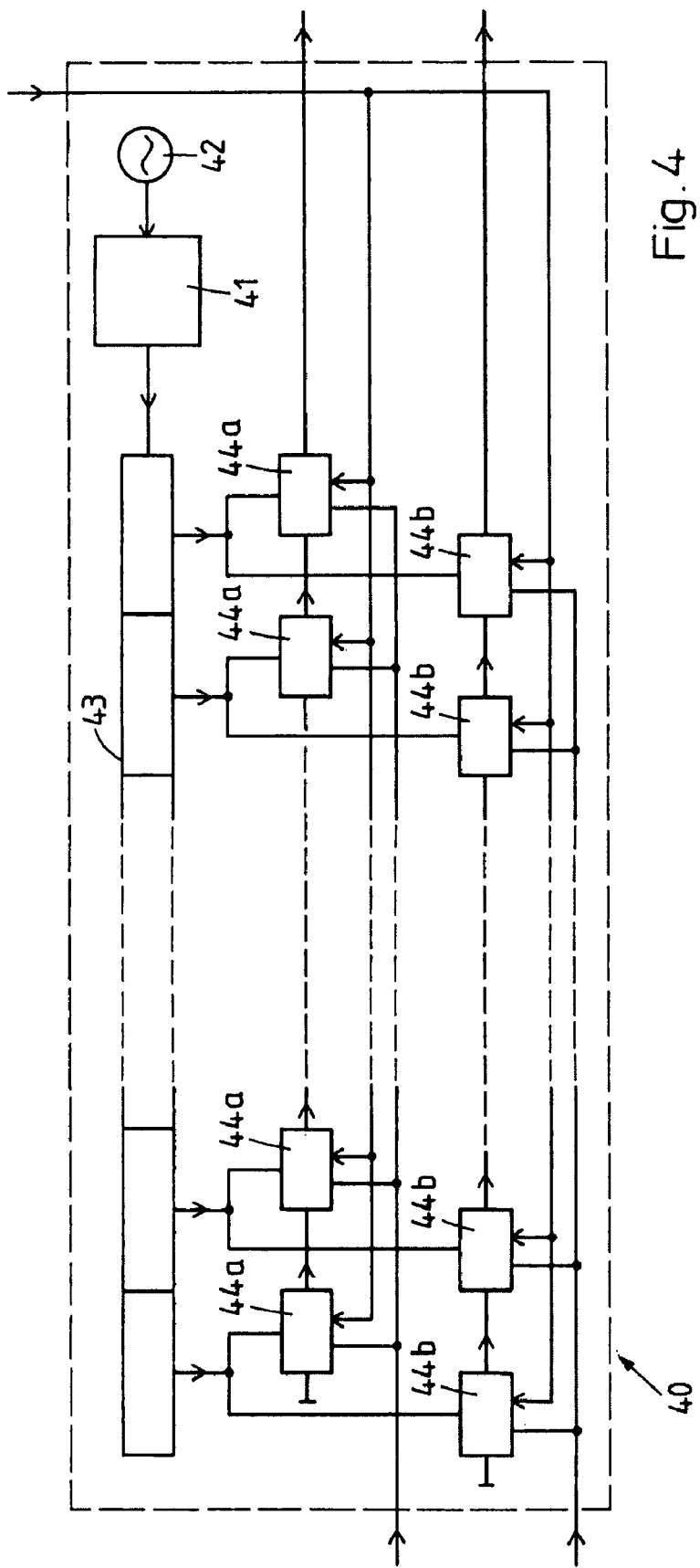
FIG. 4 shows a correlator of the acquisition unit.

The integrator 29 is followed by a correlator 40 (FIG. 4). It comprises a code generator 41 which is controlled by a numerically controlled oscillator 42. The code generator 41 is followed by a correlator shift register 43 with N cells where N is preferably chosen so as to have a multiple which is close to the length of the basic sequence, e.g., N=32, 64, 128, 256 or 512. Each of the cells of the correlator shift register 43 is connected to two correlator cells 44a, 44b. The correlator cells 44a form a first row of N correlator cells connected to a first input line of the correlator 40 which is in turn connected to the first output line of integrator 29 whereas the correlator cells 44b form a second such row which is in completely analogous manner connected to a second input line of the correlator 40 which is in turn connected to the second output line of integrator 29. Subsequent correlator cells in each row are also connected.

The correlator cells 44a,b are, in a very space-saving manner, implemented on the surface of the semiconductor chip carrying the base band circuit 5 as identical structures arranged in two straight rows of length N, both in parallel with the correlator shift register 43 and input lines substantially as shown in FIG. 4. In fact, two correlator cells 44a,b can always be arranged beside the memory cell of the correlator shift register 43 they are connected to and, together with connections and sections of the input lines, integrated into a larger structure on the chip surface which is repeated identically N times along a straight line. This way the correlator 40 can be manufactured very efficiently.

Figure 5:
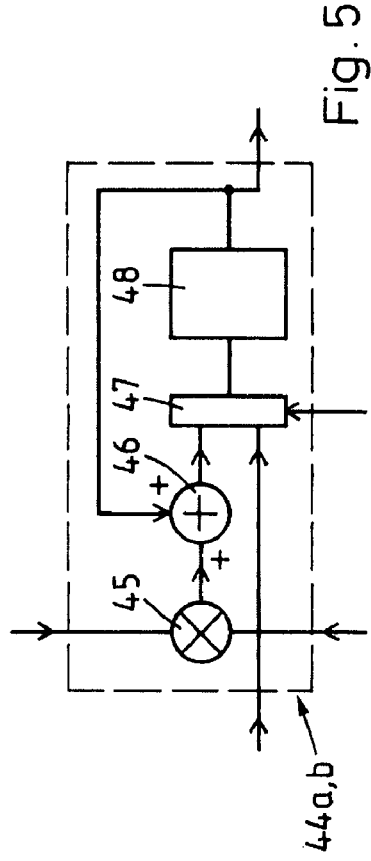
FIG. 5 shows a correlator cell of the correlator of FIG. 4
Figure 6:
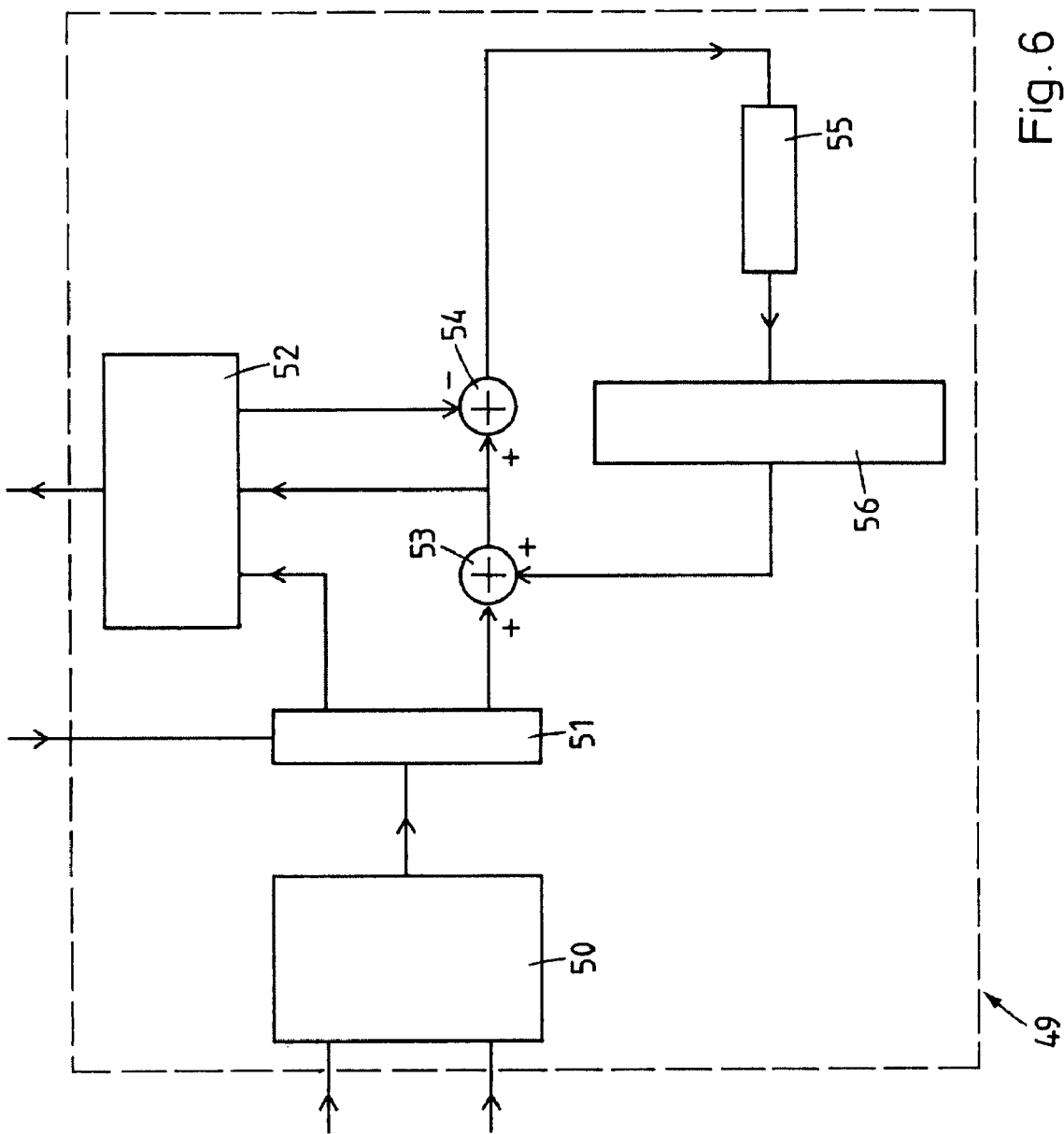
FIG. 6 shows an evaluator of the acquisition unit.

Each of the correlator cells 44a,b comprises (FIG. 5) a multiplier 45 whose inputs are connected to one of the cells of the correlator shift register 43 and the first input line or the second input line of the correlator 40, respectively, followed by a simple adder 46. A switch 47 connects the input of a register 48 either to the output of adder 46 or to an input which is connected to an output of the register 48 of the previous correlator cell 44a;b in the row or, in the case of the first correlator cell, to a register holding an initial value of zero. The output of the register 48 is connected to an input of the adder 46 and to an input of the switch 47 in the subsequent correlator cell or, in the case of the last correlator cell, to an output line of the correlator 40. Depending on the states of the switches 47 the registers 48 of the correlators cells 44a and of the correlator cells 44b are either disconnected or they form two rows of registers 48 each configured like a shift register or daisy chain.

The correlator 40 is in turn followed by an evaluator 49 whose input lines are connected to a processing unit 50 and, via a bit shifter 51, to an arbitration unit 52 whose output is connected to the control unit 18, and a limiting adder 53. The output of the latter is, via another limiting adder 54 which subtracts a number delivered by the arbitration unit 52, connected to a shift register 55 with a number of memory cells which corresponds to the number N of correlator cells 44a;b in one of the two rows of correlator cells in correlator 40 and in parallel to arbitration unit 52. The shift register 55 is followed by a RAM-type memory unit 56 whose output is connected to the second input of adder 53.

In the integrator 29 an integration process is carried out over an integration period which is a multiple of the basic interval of 1 ms, e.g., over 20 ms or more. Samples of the base band complex digital signal, after it has been reduced to 3 bits in decimator 22 and passed the downsamplers 23a,b, arrive at the input of the integrator 29 at a sample frequency of 2 MHz and the I and Q components are stored for the duration of a corresponding interval of approximately 0.5 µs in registers 30a;b. The signal is then mixed with the output signal of each of the oscillators 33a to 33h in turn to compensate for Doppler shift and possible clock error of the GNSS receiver and the components of the result are, at a frequency of 16 MHz, delivered to the registers 32a;b. The switches 38a,b connect the adders 39a;b to either memory units 36a;b or memory units 37a;b for the duration of the integration period whereas the remaining memory units 37a;b or 36a;b, respectively, are connected to the output of the integration unit 29 via switches 39a;b. For the sake of simplicity it is assumed in the following that memory units 36a,b are connected to the adders 35a;b and memory units 37a,b to the outputs.

The digital values stored in the registers 32a,b are fed to one input of the adder 35a;b while an intermediate digital value from a memory cell of memory unit 36a;b or, at the beginning of the integration period, a zero is fed to the other input. The result output by the adder 35a;b, i.e., the sum of the intermediate value read from the memory cell and the value from the register 32a;b, is then written to the same memory cell as a new intermediate value, the previous intermediate value being overwritten. This read-modify-write cycle requires three steps and therefore a 48 MHz clock rate.

If the integration interval is, e.g., M times the basic interval, samples which pertain to the same oscillator, i.e., the same Doppler frequency and to the same phase, i.e., have the same position with respect to the beginning of the basic interval, are added up coherently whereby the signal to noise ratio is considerably increased in comparison with the incoming digital signal. An integration period of 20 ms which conforms to the length of a data bit is adequate for a 'cold start' where no data are known previously to acquisition. If satellite data are known beforehand inversions of the basic sequence due to modulation by data bits can be taken into account and longer integration intervals are possible.

At the same time, the memory units 37a,b which are connected to the outputs of the integrator unit 29 and further to the correlator unit 40 can be read with a different clock rate which is independent from the clock rate for the read-modify-write cycle and preferably higher, e.g., 96 MHz.

In the correlator 40 the I-component of the output signal of the integrator unit 29 is fed in parallel to each of the correlator cells 44a in the first row and the Q component to the correlator cells 44b of the second row. The code generator 41 generates a binary correlation sequence which is derived from the basic sequence characteristic of one of the satellites in that it consists of fixed multiples of the basic values, i.e., every one of the basic values is repeated a fixed number of times, e.g., K times with $K \geqq 1$. The length of the correlator sequence is accordingly 1'023×K. In the following the limiting case with K=1 is assumed where the correlation sequence corresponds to the basic sequence. Previously to the beginning of the correlation the code generator 41 has filled the correlator shift register 43 with the first N values of the correlation sequence, that is, with an initial subsequence of the said correlation sequence in such a way that the left-most cell of the correlator shift register 43 holds the first value of the correlation sequence and the right-most the $N^{th}$. In the following the code generator 41 generates further values of the correlation sequence until the same is complete, beginning with the $(N+1)^{th}$.

While the correlation sequence is further shifted through the correlator shift register 43 the data values read from the memory units 37a,b are fed to the first input and second input, respectively, of the correlator 40 as a data sequence. The ratio of the frequency of code generation to the frequency of data value read-out corresponds to the ratio of the chip rate of the basic sequence to the sample rate, i.e., 1'023 to 2'000.

Normally two subsequent data values are therefore processed with the same value of the correlation sequence, but there are 23 extra shifts of the said sequence by 1 where the value changes after having been used with a single data value. No multiple of the chip frequency has been chosen for the sampling frequency because otherwise the sampling might consistently coincide with a chip boundary which would lead to a random result for the data values. It has therefore been found to be advantageous that the sample rate at the acquisition unit 25 deviate from a multiple of the chip rate, in particular by between 1% and 5%, the sampling rate preferably being slightly smaller than the said multiple of the chip rate.

During a correlation phase the 2'000 subsequent data values making up the data sequence are processed in each of the correlator cells 44a,b in parallel together with the 1'023 values of the correlation sequence, that is, the complete correlation sequence. At the end of the correlation phase the left-most cell of the correlator shift register 43 holds the $1023^{rd}$ value of the correlation sequence and the right-most the $(N-1)^{th}$. In each of the correlator cells 44a,b a correlation result is determined, in the example a correlation value component which is calculated in that the actual data value, i.e., its I or Q component, respectively, is in each case multiplied in the multiplier 45 by the actual value from the memory cell of the correlator shift register 43 the correlator cell is connected to and the product, in adder 46, added to the sum of previous results and the sum written to the register 48 via switch 47.

When the correlation phase is finished, a read-out phase follows. The position of switch 47 is changed in every one of the correlator cells 44a,b by a control signal from control unit 18 and the input of the register 48 connected to the output of the register 48 of the previous cell. The registers 48 of the first row and the second row, respectively, are thereby connected to form a shift register or daisy chain connected to the first output and the second output, respectively, of the correlator 40. Their contents are in each case shifted to the right (FIG. 4) through the corresponding row of registers 48 and appear sequentially at the outputs of the registers 48 of the last, that is, right-most of the correlator cells 44a;b, i.e., at the first output line and the second output line, respectively, of the correlator unit 40 while at the same time the registers 48 are, from the left, filled with zeros for initialization.

The N correlation results correspond to correlations of the data sequence with N copies of the correlation sequence where each copy of the basic sequence is delayed by 1 with respect to the previous copy in each case. That is, for a given Doppler frequency and a given satellite correlations corresponding to N different phase positions of the correlation sequence with respect to the incoming signal are calculated in parallel.

During the read-out phase, i.e., while the correlation results are sequentially delivered to the evaluator 49, the code generator 41 produces N more values of the correlation sequence which are fed through the correlator shift register 43. At the end of the read-out phase the correlator shift register 43 therefore holds a new initial subsequence beginning with the $(N+1)^{th}$ value in the left-most cell and ending with the $(2N)^{th}$ value of the correlation sequence in the right-most cell, i.e., the part of the correlator sequence following immediately and without overlap upon the previous initial subsequence and having the same length of N.

During the next correlation phase the same data values are fed to the correlator 40 and processed in a completely analogous manner with the only difference that the phase positions of the correlation sequence with respect to the data sequence have been increased by N. With N=64, 128, 256 or 512, after 16, 8, 4, or 2 passes, respectively, each comprising a correlation phase and a read-out phase, 1'024 correlations for all relative phase positions of the correlation sequence with respect to the data sequence—with an overlap of 1—have been calculated and delivered to the evaluator 49.

In the example given above—where K=1—the data sequence is correlated with 1'024 copies of the basic sequence with subsequent copies shifted by one place. The time resolution is consequently one chip. If a time resolution of half a chip is desired, K is chosen to equal 2. In that case the $(2n)^{th}$ and the $(2n-1)^{th}$ value of the correlation sequence both equal the $n^{th}$ value of the basic sequence, i.e., the first and second values of the correlation sequence correspond to the first basic value, the third and fourth values to the second basic value and so on. The code generator then feeds the 1'023×2=2'046 values of the correlation sequence to the correlator shift register 43. The data sequence is correlated with 2'046 copies of the correlation sequence with a subsequent copy again shifted by one with respect to the preceding copy. However, a shift by one corresponds in this case to a shift by half a chip length of the basic sequence with respect to the basic sequence as encoded in the satellite signal. The number of passes, each comprising a correlation phase and a read-out phase, is double the number with full chip resolution. Choosing a higher value for K only leads to truly better time resolution if the sampling rate is commensurate. The length of the data sequence should be at least approximately equal to the length of the correlation sequence or greater.

Contrarily, it is also possible in the first-described K=1 case, to speed up processing by using a data sequence which consists of every second data value stored in memory 37. In that case the number of passes is the same but the time required for a correlation phase is cut in half. The read-out phase, however, is not affected.

During each read-out phase correlation value components $C_I$, $C_Q$, corresponding to the I and Q components of the data values, are delivered from the correlator 40 to the processing unit 50 of the evaluator 49. Here they are combined to form correlation value C with $$C=\max(|C_I|+|C_Q|/4, |C_Q|+|C_I|/4) \quad (1)$$

This expression has been found to approximate the absolute value of $(C_I,C_Q)$, i.e., $\sqrt{(C_I^2+C_Q^2)}$ sufficiently well for evaluation purposes whereas it requires much less processing time than the calculation of the exact value. This is an important advantage since the evaluator runs at a high clock rate.

If the correlation values are generally small they are multiplied by 2 or 4 in bit shifter 51 which is controlled by control unit 18. In a normal mode of the evaluator 49 16 bit correlation values from a first output of the bit shifter 51 are used as correlation indicators in arbitration unit 52. The latter selects and stores a set of largest correlation indicators, preferably three or more of them, e.g., six, together with parameters identifying the corresponding Doppler frequency and phase position. If a new correlation indicator is larger than the sixth largest found so far the same is replaced by it. The arbitration unit 52 also keeps track of the minimum and of the sum of the correlation values. At the end of a correlation the six largest correlation indicators, each together with the corresponding Doppler frequency and phase position, are delivered to the control unit 18.

A complete correlation process usually consists of carrying out several correlations, each using a specific basic sequence and taking into account all possible phase positions of the same with the desired resolution—in the examples 1'023 and 2'046 different phase positions—and eight Doppler frequencies. The basic sequences employed are usually restricted to such as are characteristic for satellites which are likely to be visible at the time. One and the same data sequence can normally be used for all correlations.

If the largest correlation indicators are sufficiently pronounced compared with the average of the correlation indicators the normal mode described above yields a sufficient set of data for the control unit 18 to control the tracking unit 26 accordingly. If no or not enough sufficiently pronounced such largest correlation indicators are found clock error is a possible cause. The control unit 18 will therefore try further Doppler frequencies in the integrator 29 which are either higher or lower than the frequencies employed so far.

However, a lack of sufficiently significant correlation values where the largest of them remain below a certain threshold as compared with the average may also be due to especially difficult conditions, in particular low and variable signal to noise ratio. In this case the evaluator 49 is switched to a deep search mode by the control unit 18. In this mode, a large number of correlation procedures, e.g., 100, are carried out, each with a fresh set of data values, and the resulting correlation values are superposed. That is, correlation values resulting from correlations of different data sequences but corresponding to a given basic sequence, Doppler frequency and phase position are added up. As in this case the adding-up extends over a relatively long time, e.g., 2 s overall, in order to keep the sums coherent with respect to phase position the correlation sequence used in correlator 40 is, in relation to the data sequence, shifted at fixed intervals according to the Doppler frequency employed in the integrator 29, normally by one each time the phase-shift reaches the length of a chip.

In deep search mode, a second output of the bit shifter 51 is used which delivers 8 bit correlation values. The memory unit 56 is organised into 2×8 memory banks of 1'023 8 bit memory cells. During a correlation process with a first data sequence correlations involving two basic sequences are carried out, each with eight different Doppler frequencies and 1'023 phase positions and the resulting correlation values stored in the memory unit 56 according to basic sequence, Doppler frequency and phase position.

Each subsequent data sequence is correlated in the same way. When during a read-out phase a new 8 bit correlation value from the second output of bit shifter 51 is delivered to adder 53, it is added to a sum of previous correlation values corresponding to the same basic sequence, Doppler frequency and phase position, which has been read from the memory unit 56. In adder 54, a minimum value from previous correlations delivered by arbitration unit 52 is subtracted to prevent overflow and the result fed to shift register 55. During the following correlation phase the content of the shift register 55 is transferred to the memory unit 56 and the sums of previous correlation values overwritten each with the corresponding new sum.

The correlation sum, i.e., the new correlation value added to the sum of previous correlation values as output by adder 53 is in each case also fed to arbitration unit 52 where it is used as a correlation indicator, that is, it is processed in essentially the same way as the individual correlation values are processed in the normal mode. The deep search mode allows signal acquisition even under the very difficult and varying conditions typical for indoor use of a GNSS receiver.

Deep search can also be used if the correlations are done with half chip resolution. In that case the memory unit 56 must be organised into 1×8 memory banks of 2'046 8 bit memory cells which implies that at one time correlation sums for only one basic sequence can normally be calculated and stored. The correlation sequence will have to be phase shifted according to the Doppler frequency employed whenever the phase shift reaches half the length of a chip, that is, the length of the time interval between subsequent phase shifts will, for a given Doppler frequency, be half the length of the time interval in the case of full chip resolution.

LIST OF REFERENCE SYMBOLS

1 antenna
2 radio frequency circuit
3 band pass filter
4 TCXO
5 base band circuit
6 PLL unit
7 low noise amplifier
8 controllable RF amplifier
9$a,b$ mixers
10$a,b$ high pass filters
11$a,b$ low pass filters
12$a,b$ variable gain amplifiers
13 PLL unit
14 frequency divider
15$a,b$ A/D converters
16 complex mixer
17$a,b$ frequency analyzers
18 control unit
19$a,b$ decimation filters
20$a,b$ down-samplers
21 band stop unit
22 decimator
23 frequency analyzer
24$a,b$ down-samplers
25 acquisition unit
26 tracking unit
27 frequency divider
28 frequency divider
29 integrator
30$a,b$ registers
31 complex mixer
32$a,b$ registers
33$a$-$h$ numerically controlled oscillators
34 multiplexer
35$a,b$ adders
36 memory
36$a,b$ memory units
37 memory
37$a,b$ memory units
38$a,b$ switches
39$a,b$ switches
40 correlator
41 code generator
42 numerically controlled oscillator
43 correlator shift register
44$a,b$ correlator cells
45 multiplier
46 adder
47 switch
48 register
49 evaluator
50 processing unit
51 bit shifter
52 arbitration unit
53 adder
54 adder
55 shift register
56 memory unit

The invention claimed is:

1. A method of processing a digital signal derived from an analog input signal of a GNSS receiver containing at least one encoded binary sequence characteristic of at least one GNSS satellite and consisting of repetitions of a characteristic basic sequence which extends over a basic interval, the method comprising the following consecutive steps:

deriving at least one finite length data sequence consisting of digital data values from the digital signal, sequentially feeding digital values of a correlation sequence derived from the basic sequence to a correlator shift register comprising a plurality of sequentially connected memory cells in order to sequentially fill the memory cells of the correlator shift register with consecutive values of the correlation sequence, the consecutive values forming an initial subsequence, during a correlation phase: feeding the correlation sequence further through the correlator shift register and correlating the data sequence with a plurality of copies of the correlation sequence having different phase positions with respect to the data sequence in parallel by in each case sequentially multiplying the data values each with the value from one of the plurality of memory cells of the correlator shift register and adding up the products to form a correlation result, and storing each one of the plurality of correlation results in one of a plurality of registers, during a read-out phase which follows upon the correlation phase: shifting the plurality of correlation results through the plurality of registers in such a way that the correlation results appear sequentially at the output of a last one of the plurality of registers.

2. Method according to claim 1, where the correlation sequence consists of fixed multiples of basic values which make up the basic sequence.

3. Method according to claim 1, where the length of the data sequence differs from a multiple of a length of the correlation sequence by between 1% and 5%.

4. Method according to claim 1, where during the read-out phase each of the registers is filled with an initial value after the correlation result has been shifted to a subsequent register.

5. Method according to claim 1, where several correlation phases, each followed by a read-out phase, are carried out and during further read-out phases the correlator shift register is in each case filled with values of the correlation sequence forming a further initial subsequence not overlapping with the previous initial subsequence and preferably immediately following upon the same.

6. Method according to claim 1, where deriving the data values from the digital sequence involves a step of integration where consecutive digital values of the digital sequence separated by a length of the basic interval are summed up.

7. Method according to claim 6, where previous to integration the digital signal is mixed with a plurality of different frequency signals in that every sample is multiplied sequentially with numbers each representing one of the frequency signals.

8. Method according to claim 1, where an evaluation is carried out determining a correlation indicator from the correlation results corresponding to a phase position and selecting a set of largest correlation indicators from the correlation indicators corresponding to diverse phase positions, each together with the corresponding phase position.

9. Method according to claim 8, where in a normal mode the correlation values are used as correlation indicators in the evaluation.

10. Method according to claim 8, where in a deep search mode correlation values determined with a plurality of different data sequences but corresponding to the same basic sequence, Doppler frequency and phase position are added up to form correlation sums which are then used as correlation indicators in the evaluation.

11. Method according to claim 10, where in deep search mode a minimum of correlation values is determined and subtracted each time a correlation value is added.

12. Method according to claim 9, where a deep search mode with correlation values being determined with a plurality of different data sequences but corresponding to the same basic sequence, Doppler frequency and phase position are added up to form correlation sums which are then used as correlation indicators in the evaluation is employed whenever at least one previous normal mode evaluation has not yielded a sufficient number of largest correlation indicators each exceeding an average of correlation indicators by a given threshold.

13. GNSS receiver base band circuit, with an acquisition unit for processing the digital values of the digital signal, the acquisition unit comprising a correlator with a code generator for generating a correlation sequence derived from a characteristic basic sequence, a correlator shift register having a plurality of sequentially connected memory cells and being configured to be fed by the code generator, a plurality of correlator cells, each connected to an input of the correlator and to one of the memory cells of the correlator shift register and comprising a multiplier for multiplying a data value present at an input of the correlator with a value of the correlation sequence read from the memory cell to form a product, a register for storing a value and an adder configured to add the product to the said value, and a switch configured to connect an input of the register either to the output of the adder or to the register of a previous correlator cell where applicable.

14. GNSS receiver base band circuit according to claim 13, where in a first correlator cell the switch is configured to connect the input of the register either to the output of the adder or to the output of a register holding an initial value.

15. GNSS receiver base band circuit according to claim 13, the registers of the correlator cells forming at least one row of registers with consecutive registers connected via one of the switches.

16. GNSS receiver base band circuit according to claim 15, comprising a semiconductor chip with a chip surface carrying the correlator cells implemented as identical structures, with correlator cells whose registers form a row of registers being arranged in a straight line.

17. GNSS receiver base band circuit according to claim 16, where the chip surface of the semiconductor chip also carries the correlator shift register, with the memory cells of the same being implemented as identical structures and arranged in a row parallel to the at least one row of correlator cells in such a way that each memory cell is situated beside the at least one correlator cell which is connected to the same.

18. GNSS receiver base band circuit according to claim 15, the number of correlator cells whose registers form a row of registers being at least 64 and preferably at least 128.

19. GNSS receiver base band circuit according to claim 13, the acquisition unit further comprising an integrator preceding the correlator, the integrator comprising at least one adder and at least one first memory unit and at least one second memory unit and switching means configured to either connect the at least one first memory unit to the adder for feeding an intermediate value stored in a memory cell of the first memory unit to the same and writing the result of an addition of a digital value to the intermediate value to the same memory cell and to connect the at least one second memory unit to an output of the integrator or connect the at least one second memory unit to the adder and the at least one first memory unit to the output of the integrator.

20. GNSS receiver base band circuit according to claim 13, the acquisition unit further comprising at least one register configured for intermediate storage of a digital value pertaining to a digital signal fed to the input of the acquisition unit, a plurality of oscillators configured to sequentially provide frequency signal values pertaining to different frequencies, a mixer configured to multiply the digital value with a frequency signal value and a multiplexer configured to connect each of the oscillators to the mixer in turn.

21. GNSS receiver base band circuit according to claim 13, the acquisition unit further comprising an evaluator with a processing unit connected to the output of the correlator and configured to determine correlation values and an arbitration unit configured to select a set of largest correlation indicators each together with its phase position from correlation indicators determined from the correlation values.

22. GNSS receiver base band circuit according to claim 21, the evaluator comprising an adder with one input connected to the output of the processing unit and a memory with a plurality of memory cells, each corresponding to a basic sequence, a Doppler frequency and a phase position, the memory being configured to feed a value from a memory cell to a second input of the adder for adding a correlation value corresponding to the same basic sequence, Doppler frequency and phase position to it and deposing the sum in the same memory cell.

23. GNSS receiver comprising a base band circuit according to claim 13 and further comprising a radio frequency circuit with at least one mixer for providing an analog signal and with at least one A/D converter for converting the analog signal to a digital signal.

* * * * *